(12) United States Patent
Haukeness

(10) Patent No.: US 6,413,299 B1
(45) Date of Patent: Jul. 2, 2002

(54) LIQUID SLUG AND GAS SEPARATION METHOD AND APPARATUS FOR GAS PIPELINES

(76) Inventor: Miles E. Haukeness, Box 1247, Estevan (CA), S4A 2H8

( * ) Notice: Subject to any disclaimer, the term of this patent is extended or adjusted under 35 U.S.C. 154(b) by 8 days.

(21) Appl. No.: 09/643,844

(22) Filed: Aug. 23, 2000

(51) Int. Cl.⁷ ............................................... B01D 19/00
(52) U.S. Cl. ............................ 95/241; 95/260; 96/155; 96/204
(58) Field of Search ........................ 95/241, 253, 260; 96/155, 193, 204, 206

(56) References Cited

U.S. PATENT DOCUMENTS

| | | | | |
|---|---|---|---|---|
| 3,708,961 A | * | 1/1973 | Kimmel, III | |
| 4,160,652 A | * | 7/1979 | Martin et al. | |
| 4,519,815 A | * | 5/1985 | Buls et al. | |
| 4,522,218 A | * | 6/1985 | Konak | |
| 4,639,340 A | * | 1/1987 | Garrett | |
| 5,158,579 A | * | 10/1992 | Cartensen | |
| 5,232,475 A | * | 8/1993 | Jepson | |
| 5,250,104 A | * | 10/1993 | Berger et al. | |
| 5,256,171 A | * | 10/1993 | Payne | |
| 5,288,312 A | * | 2/1994 | Payne et al. | |
| 5,322,551 A | * | 6/1994 | Payne | |
| 5,507,858 A | * | 4/1996 | Jepson | |
| 5,707,427 A | * | 1/1998 | Stockman et al. | |
| 6,017,383 A | * | 1/2000 | Jepson | |

* cited by examiner

*Primary Examiner*—Duane S. Smith

(57) ABSTRACT

In the instant invention a secondary gas pipeline is constructed which runs in parallel with the primary gas pipeline and which secondary gas pipeline is of an appropriate size and configuration that a liquid slug passing through the primary gas pipeline will tend to divide and partially enter the secondary gas pipeline, and while in the secondary gas pipeline will substantially become transformed into a two phase flow one phase of which is gas and the other phase of which is liquid, and wherein when the gas phase in the secondary gas pipeline re-enters the primary gas pipeline it will tend to cause the dissipation of any liquid slugs in the primary gas pipeline at the point of re-entry.

5 Claims, 1 Drawing Sheet

LIQUID SLUG AND GAS SEPARATION METHOD AND APPARATUS FOR GAS PIPELINES

BACKGROUND OF THE INVENTION

1. Field of the Invention

The present invention relates in general to a method and apparatus for facilitating the dissipation of a liquid slug that is flowing together with compressed gas in a pipeline; and in particular to a method and apparatus for dividing a liquid slug into two liquid slugs, one of which is facilitated to dissipate into a two phase flow of separate liquid and separate gas, and then recombining the two phase flow with the remaining liquid slug in a manner that facilitates the dissipation of that other liquid slug into a two phase flow of separate liquid and separate gas.

2. Description of the Related Art

To the best of the Inventor's knowledge this is a unique invention which has no related prior art. There is tangential prior art relating to methods and apparatuses for the removal of liquids or liquid slugs from a gas pipeline which has a liquid slug and liquid/gas flow. The Inventor's prior invention, disclosed in U.S. Pat. No. 5,525,133, and in Canadian Patent #2,129,306, is one such invention. However the present invention does not deal with the removal of a liquid slug from a gas pipeline, the present invention is a method and apparatus to facilitate the dissipation of a liquid slug that is flowing in a gas pipeline, and therefore, if that liquid slug was traveling in the gas pipeline together with gas, in a substantially unified flow stream, on the dissipation of the liquid slug the liquid (which was traveling as a slug) will thereafter have a unique and distinguishable flow stream from the gas with which it had been traveling, which gas will thereafter also then have its own unique and distinguishable flow stream.

Liquid can exist as single molecules or as droplets, and when liquid molecules of the same or similar types have a sufficient cohesion for each other, liquid can also exist in a mass. In gas pipelines there often exists sufficiently cohesive liquids, which, as they travel through the pipeline develop into liquid slugs that travel through the pipeline substantially intact or growing in size.

The flow regime of a gas pipeline that is carrying both gas and liquid can have more than one configuration depending on several factors, the most significant of which are: the operating gas pressure, liquid viscosity, liquid density, surface tension, gas/liquid velocities, and the vertical rise/fall of the pipeline. At low gas and low liquid flow rates, the flow regime is generally stratified (i.e. a two phase flow) with the gas phase flowing at a faster rate above the liquid phase, and the liquid flowing along the bottom of the pipeline. The difference in phase velocity is due to slip that occurs at the gas/liquid interface. At higher gas flow rates and low liquid flow rates, the flow regime is generally an annular flow in which the liquid flows mainly near the inside wall of the pipeline and the gas flows mainly in the center of the pipeline. The annular flow regime is two phase and the gas phase velocity is higher than the liquid phase velocity. However, at low to high gas flow rates and high liquid flow rates the liquid can develop into a liquid slug and will travel down the pipeline as a single phase liquid flow and at or near the same velocity as the gas phase flowing in the pipeline. The liquid slug usually develops from a stratified two phase flow in a gas pipeline when waves form at the gas/liquid interface and grow to the point where they fill the cross-section of the pipeline, blocking the gas flow. Typically, the flow rate of the gas phase is much higher than that of the liquid phase, the liquid slugs are therefore accelerated by the gas phase to approximately the same velocity as the gas phase. The liquid slugs thus travel at a much higher flow rate than the non-slug portion of the liquid phase. As a result, the piping and related equipment downstream of the slugs may experience intermittent surges and subsequent impact from the slugs. Such surging may place stresses on the pipeline and processing equipment and may lead to the pipeline or the processing equipment or both becoming damaged.

In addition to the potential for causing damage, the liquid slugs are difficult to remove by conventional liquid separation equipment, and therefore in gas pipelines it is desirable, to as far as possible, reduce the existence of liquid slugs. When a liquid slug flowing through a gas pipeline is changed to a two phase gas/liquid flow regime, it facilitates the separation and removal of the liquid phase from the gas pipeline.

BRIEF SUMMARY OF THE INVENTION

An object of the present invention was to design a method and a means to cause a liquid slug and gas that is traveling down a pipeline to divide into two liquid slug and gas flows traveling in two pipelines.

A second object of the present invention is to devise a method and a means to facilitate the dissipation of the liquid slug in one of the two liquid slug and gas flows into a separate liquid flow and a separate gas flow.

A third object of the present invention is to devise a method and a means to combine the created separate liquid flow and separate gas flow with the other liquid slug and gas flow in a manner that facilitates the dissipation of that other liquid slug into a two phase flow of separate liquid and separate gas.

A fourth object of the present invention was to achieve the first two objects by an apparatus which is relatively inexpensive, and easy construct, install and operate.

A fifth object of the present invention was to achieve the first four objects by an apparatus that is relatively maintenance free.

Where there is a primary gas pipeline in which gas and any liquids and any liquid slugs in the pipeline are traveling through the primary gas pipeline in the pipeline's downstream direction, the method of the present invention that accomplishes the above objects is comprised of constructing a phase separation pipe, hereinafter also referred to as a "secondary gas pipeline", and then communicatively connecting the secondary gas pipeline in parallel with the primary gas pipeline, wherein the secondary gas pipeline is of a configuration such that a significant percentage of a liquid slug traveling through it, from its input end to its output end, will not remain as a liquid slug, but will become a two phase flow of liquid and gas, and which secondary gas pipeline is of such a configuration and of a length, and is located along the primary gas pipeline such that any liquid slug and gas "LSG" which arrives at the upstream point of connection of the primary gas pipeline with the secondary gas pipeline will divide into LSG1 that continues traveling down the primary gas pipeline and LSG2 that enter the secondary gas pipeline; wherein LSG1 is a portion of LSG and LSG2 is the remaining portion of LSG such that LSG1+LSG2=LSG; and wherein the secondary gas pipeline is connected to the primary gas pipeline at the appropriate downstream location such that when LSG2 leaves the secondary gas pipeline and re-enters the primary gas pipeline it will re-enter the primary gas pipeline at the time of the arrival, at the location at which LSG2 re-enters the primary gas pipeline, of the front portion of the largest LSG1 that is anticipated to be traveling through the primary gas pipeline.

The apparatus of the present invention that accomplishes the above objects, when said apparatus is connected in parallel with a primary gas pipeline in which gas and any liquids and any liquid slugs in the primary gas pipeline are traveling through the pipeline in the pipeline's downstream direction, is a phase division pipe, which, as previously mentioned herein is also referred to as a "secondary gas pipeline", which secondary gas pipeline is comprised of: an input end; and a first section that is in continuous communication with the input end, which first section is of a smaller diameter than is the diameter of the primary gas pipeline; and a second section that is in continuous communication with the first section, which second section is of a larger diameter than is the diameter of the first section; and an output end that is in continuous communication with the second section; and wherein the input end may be sealingly attached to the primary gas pipeline; and which output end may be sealingly attached to the primary gas pipeline downstream of the input end, and wherein the diameter and length of the first section and the diameter and length of the second section are selected such that bearing in mind the configuration in which they will be attached to each other and to the gas pipeline, when the input end is sealingly attached to the gas pipeline and the output end is sealingly attached to the gas pipeline downstream of the input end, any liquid slug and gas LSG2 that enters the second section will divide into a two phase flow comprised of liquid and of gas flowing separately prior to reaching the output end; and wherein said separately flowing liquid and gas will arrive at said output end at the time of the arrival of the front portion of the largest anticipatable liquid slug LSG1 arriving at said output end; wherein LSG1+LSG2=LSG, and LSG was the original liquid slug traveling down the primary gas pipeline and LSG2 was a portion of LSG that divided off from LSG at the input end and entered the secondary gas pipeline at its input end, and LSG1 was the portion of LSG that continued to travel down the primary gas pipeline from after the input end of the secondary gas pipeline.

In operation, when a liquid slug and the gas that is traveling with it through the gas pipeline both arrive at the input end of the secondary gas pipeline, part of the liquid slug and gas will continue to travel downstream through the primary gas pipeline and part of the liquid slug and gas will enter the secondary gas pipeline. Because the first portion of the secondary gas pipeline is of a smaller diameter than is the diameter of the primary gas pipeline less of the slug will go into the secondary gas pipeline than will remain traveling down the primary gas pipeline. Hence, of the liquid slug that reaches the input junction of the primary and secondary gas pipelines, Y % will go into the secondary gas pipeline and (100−Y) % will remain in the primary gas pipeline, where Y<50. The first section of the secondary gas pipeline directs the Y % of the liquid slug into the second section of the secondary gas pipeline, which second section is of a larger diameter than is the first section. Once the portion of the slug that is traveling in the secondary gas pipeline goes from the smaller diameter first section into the larger diameter second section it will tend to turn into a substantially two phase flow of gas and liquid that is separate, with the gas and the liquid each flowing at their own rate. Therefore, what entered the secondary gas pipeline as a unified liquid slug and gas all flowing in a unified manner will exit the secondary gas pipeline as a two phase flow of gas and separate liquid. Then, because of the selected diameters and lengths and configuration of the secondary gas pipeline, the two phase flow of gas and liquid that re-enters the primary gas pipeline from the output of the secondary gas pipeline will be re-entering the primary gas pipeline onto or in front of the front portion of the (100−Y) % of the liquid slug that continued traveling through the primary gas pipeline when the Y % of the liquid slug divided off into the secondary gas pipeline. The re-entering of the gas phase from the secondary pipeline will then facilitate the transformation of the (100−Y) % of the remaining liquid slug into a two phase flow of separate gas and liquid each flowing at its own rate.

DETAILED DESCRIPTION OF THE INVENTION

The preferred method of the present invention for use with a primary gas pipeline in which gas and any liquids and any liquid slugs in the primary gas pipeline are traveling through the primary gas pipeline in the pipeline's downstream direction, is comprised of: constructing a phase separation pipe, which is also referred to herein as a "secondary gas pipeline"; and then of communicatively connecting the secondary gas pipeline in parallel with the primary gas pipeline; wherein the secondary gas pipeline is of a configuration such that a significant percentage of a liquid slug traveling through it, from its input end to its output end, will not remain as a liquid slug, but will become a two phase flow of liquid and gas in which the liquid and the gas each has its own separate flow rate, and which secondary gas pipeline is of such a configuration and of a length, and is located along the primary gas pipeline such that any liquid slug and gas traveling in a unified manner, and collectively referred to as "LSG" which arrives at the upstream point of connection of the primary gas pipeline with the secondary gas pipeline will divide into LSG1 that continues traveling down the primary gas pipeline and LSG2 that enters the secondary gas pipeline; wherein LSG1 is a portion of LSG and LSG2 is the remaining portion of LSG such that LSG1+LSG2=LSG; and such that LSG2<LSG1; and wherein the secondary gas pipeline is connected to the primary gas pipeline at the appropriate downstream location such that when LSG2 leaves the secondary gas pipeline and re-enters the primary gas pipeline it will re-enter the primary gas pipeline at the time of the arrival, at the location at which LSG2 re-enters the primary gas pipeline, of the front portion of the largest LSG1 that is anticipated to be traveling through the primary gas pipeline.

Figure 1:
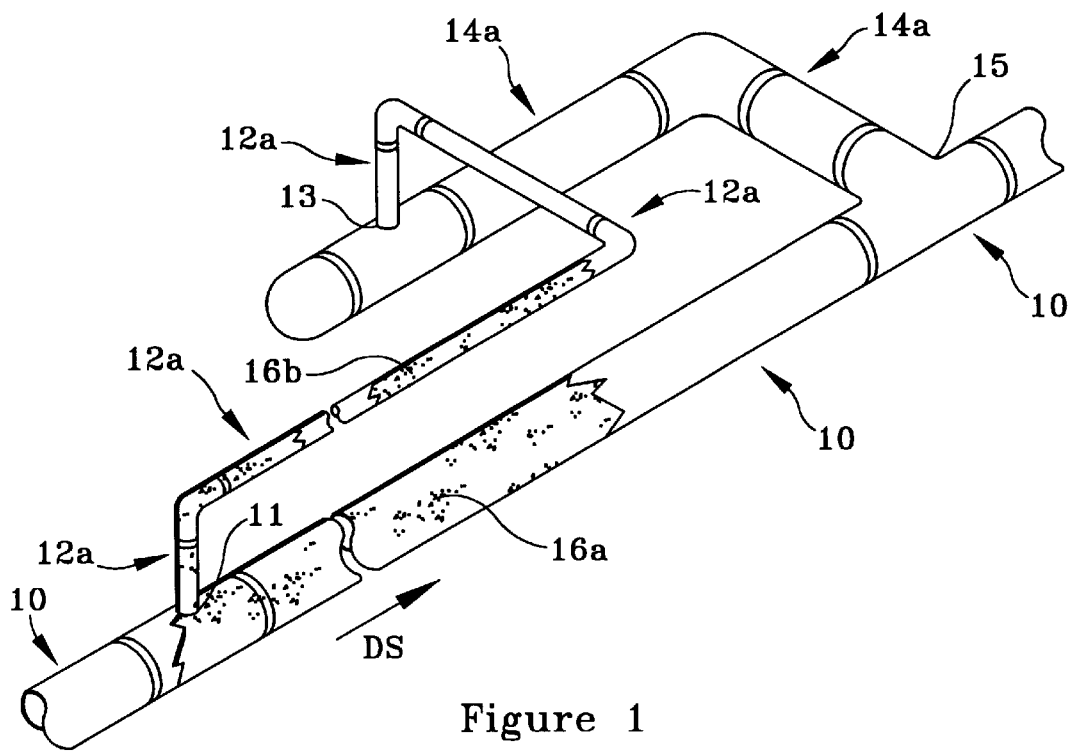
FIG. 1 is a perspective view of an embodiment of a phase separation pipe of the invention connected in parallel with a straight gas pipeline.
Figure 2:
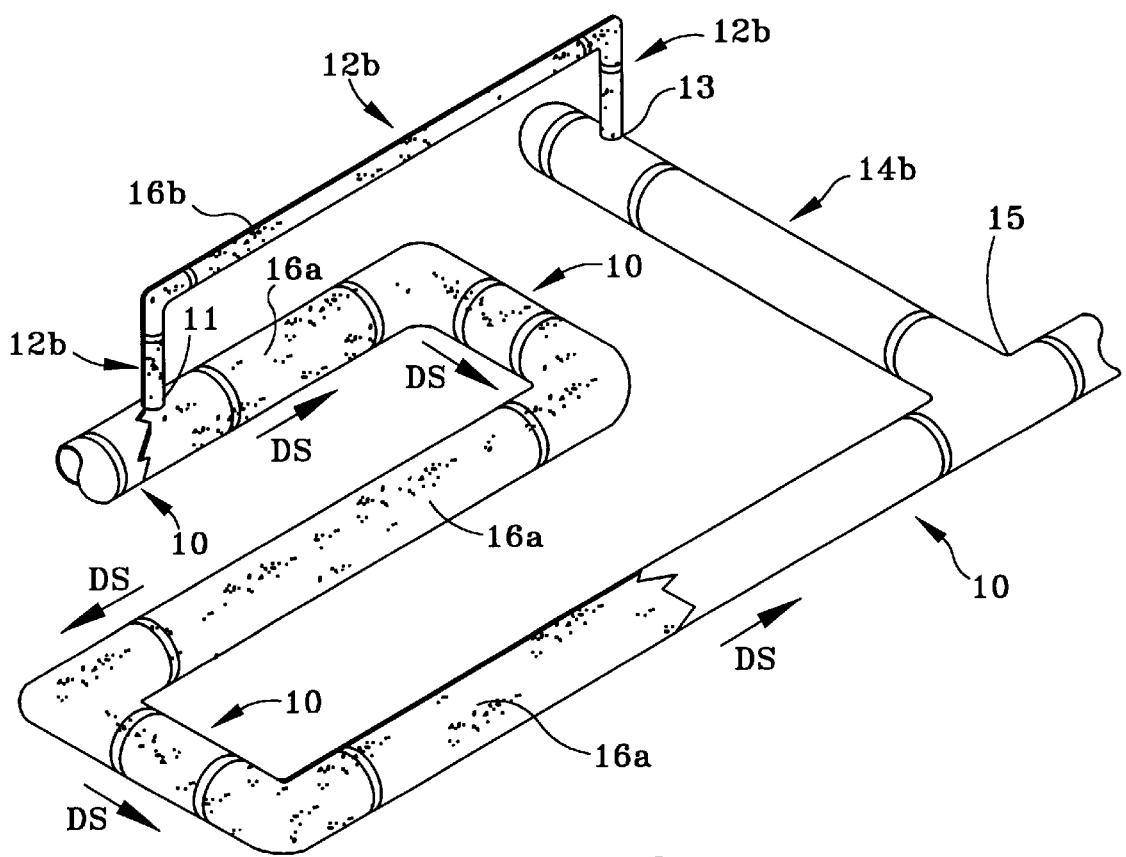
FIG. 2 is a perspective view of an embodiment of a phase separation pipe of the invention connected in parallel with a non-straight gas pipeline.

FIGS. 1 and 2 illustrate preferred embodiments of a phase separation pipe of the present invention, which is also referred to herein as a secondary gas pipeline, which preferred embodiments are connected in parallel with a primary gas pipeline 10. In FIGS. 1 and 2 the secondary gas pipeline of the present invention is comprised of: an input end 11; a first section 12a, 12b respectively, which is of a smaller diameter than is the diameter of the primary gas pipeline 10; a transitional output 13; a second section 14a, 14b respectively, the diameter of which is larger than is the diameter of the first section, wherein the transitional output 13 communicatively connects the first section with the second section; and an output end 15 which is located at the downstream end of the second section. The diameter of the second section in the preferred embodiments illustrated is the same as the diameter of the primary gas pipeline. It is not essential to the invention that the diameter of the second section be the same as the diameter of the primary gas pipeline.

As can be seen from FIGS. 1 and 2 the shape and configuration of the first sections and of the second sections can vary as long as the second section is of a larger diameter than is the first section and as long as the first section is of a smaller diameter than is the primary gas pipeline.

In FIGS. 1 and 2 it can be seen that the first sections are continuous with the second sections. It can also be seen that where the sections meet they form an approximate 90° angle. It can also be seen that where the primary gas pipeline and the secondary gas pipeline meet they also form an approximate 90° angle. Joining the sections of the invention and joining the invention to the primary gas pipeline at approximate 90° angles is the preferred method of construction of an apparatus according to the present invention, however, the angles which the sections of the invention form where they are continuous with each other is not an essential feature of the invention. It is also not an essential feature of the invention that the primary and secondary gas pipelines form 90° angles where they are connected with each other.

FIG. 1 illustrates a configuration for a phase separation pipe of the present invention that would typically be used in the field, where the primary gas pipeline is normally straight. FIG. 2 illustrates a configuration for a phase separation pipe of the present invention that would typically be used in a station, where the primary gas pipeline may be in a non-linear configuration. Typically the first section of a phase separation pipe of the preferred embodiment of the present invention illustrated in FIG. 1 will be longer than the first section of the phase separation pipe of the preferred embodiment of the present invention illustrated in FIG. 2.

A gas pipeline is typically designed to deliver gas that has been compressed and which is traveling through the pipeline under the force of the compressed gas itself as it expands through the pipeline in the downstream direction. Typically at the head end of the gas pipeline the gas is introduced into the pipeline such that it exists in a compressed state within the pipeline. At the destination end of the pipeline the gas is allowed to continuously exit the pipeline thereby creating a lower pressure at the destination end of the gas pipeline than exists at the head end. Consequently the gas continues to flow downstream through the pipeline under the force of the gas's own compression pressure. Because the gas in the pipeline is compressed and therefore in a state of higher pressure, it can travel through the pipeline even if the pipeline rises in the vertical direction. However, in most situations portions of the gas liquefy, in addition condensation of liquefiable elements within the pipeline result in liquid flowing through the pipeline along with the gas, all under the pressure of the gas.

The gas and liquid do not always flow through the pipeline in the same configurations. One possible configuration is where the gas and liquid are stratified and exist in a two phase flow regime, with the gas phase flowing at a faster rate above the liquid phase, and the liquid flowing as a substantially unified mass. A second possible configuration for the gas and liquid appears as an annular flow in which the liquid flows mainly near the wall of the pipeline and the gas flows mainly in the center of the pipeline. A third possible configuration for the gas and liquid is for a liquid slug and gas to travel down the pipeline in a more unified fashion and not in a substantially two phase flow. The phase separation pipe of the present invention, including the embodiments illustrated in FIGS. 1 and 2 is designed to facilitate turning a liquid slug and gas configuration that is flowing through the pipeline in a substantially unified manner into a two phase flow regime where the gas phase can slip by the liquid phase.

The method of applying the apparatus of the present invention to gas pipelines so that the dissipation of liquid slugs within the gas pipeline is facilitated by the apparatus of the present invention, and so that gas and a liquid slug traveling together in the gas pipeline in a unified fashion are transformed into a two phase flow, is to connect the apparatus of the present invention, which is the phase separation pipe, in parallel with the gas pipeline at the appropriate location along the gas pipeline. The appropriate location is the location along the gas pipeline immediately preceding where it is desired that any liquid slugs within the gas pipeline be dissipated and/or where it is desired that any liquid slugs and gas traveling together in the pipeline be transformed into a two phase flow.

In operation the input end and the output end of the phase separation pipe of the present invention are both continuously sealingly connected to the gas pipeline such that the phase separation pipe is running in parallel with the gas pipeline and the output end of the phase separation pipe is downstream of the input end.

One significant advantage of the manner in which the method and apparatus of the present invention accomplishes turning a unified flowing gas and liquid slug into a two phase flow regime is the simplicity of the construction of the invention, which will result in a consistent relatively maintenance free operation of the invention. The invention is able to be constructed, as illustrated in FIGS. 1 and 2, without any moving parts, and with easily and inexpensively obtainable materials; that is a further great advantage to the gas pipeline industry because simplicity of construction and a low material cost is always an advantage in and of itself.

The scientific principles of the invention which are utilized by the Inventor are: (i) in a pressurized gas pipeline any existent liquid slug is being propelled by the pressure of the gas; (ii) once a liquid slug builds up within the pipeline to a sufficient size that it impedes the flow of the gas within the pipeline then the pressure of the gas behind the liquid slug will be greater than the pressure of the gas ahead of that liquid slug (this higher pressure gas that exists behind the liquid slug is hereinafter referred to as "rear gas"); (iii) even in a relatively unified liquid slug and gas flow, there will be a significant portion of the rear gas traveling at and near the top of the pipeline because the greater mass of the liquid slug will cause it to flow in the bottom portion of the pipeline pushing the rear gas to the top portion of the pipeline; (iv) consequently, if the rear gas is given an alternate clear downstream flow path of lower gas pressure than the pressure of the rear gas, the rear gas will take that alternate clear downstream flow path, and once in that alternate clear downstream flow path it will speed up to its natural unimpeded flow rate (which will be greater than the impeded flow rate it was able to attain behind the liquid slug); (v) the removal of some of the rear gas from behind the liquid slug will result in a reduction of rear gas pressure behind the liquid slug which will cause a reduction in the liquid slug's downstream speed of travel, which speed reduction will be related to the rate and volume of rear gas that leaves the gas pipeline and enters the phase separation pipe; (vi) therefore the clear alternate unimpeded downstream flow path, which is the phase separation pipe, once it has been connected in parallel with the gas pipeline, can be selected to be of a length, diameter and configuration such that its output end reconnects with the gas pipeline at a downstream location of its input end, such that the gas that was traveling in the clear alternate unimpeded downstream flow path will re-enter the gas pipeline at the same time as the front portion of the liquid slug that is passing through the gas pipeline at the point of re-entry; (vii) the gas re-entering the gas pipeline will mix into the liquid slug that was traveling in the pipeline and when the liquid slug completes its travel past the re-entry point, the rear gas behind the liquid slug is then in communication with the lower pressure gas in front of the liquid slug, resulting in the development of a preferred gas path for the rear gas to the front of the slug, thus enabling the gas to slip by the liquid slug and establish non-slugging two-phase flow downstream of the re-entry point; (viii) if a liquid slug is presented with two downstream flow paths, one of which is of a smaller diameter than is the other, the liquid slug will divide and a portion of it will travel down each of the downstream flow paths, however, a smaller portion of the liquid slug will enter and travel down the smaller diameter downstream flow path; (ix) if a liquid slug leaves a smaller diameter pipe and enters a large diameter pipe, in the larger diameter pipe the liquid slug will begin to dissipate and turn into a two phase flow, one phase of which is liquid and the other phase of which is gas, therefore the length of the larger diameter pipe can be selected such that most of the liquid slug turns into a two phase flow.

From the forgoing scientific principals put into practice by the Inventor in the present invention it can be seen that there are many possible different pipe length, pipe diameter, and pipe configurations for the phase separation pipe of the present invention, all of which are within the scope of and disclosed by the present invention. If the terrain or space within which the gas pipeline is situated, or the configuration of the gas pipeline requires it, the overall shape of the phase separation pipe can be changed from a rectangular shape (illustrated in FIGS. 1 and 2 to any other desired shape (not illustrated).

The shape, configuration, diameter(s) and overall length of the phase separation pipe of the present invention will be selected in accordance with the pipeline's flow characteristics and the anticipatable largest liquid slug, and the requirements of the gas pipeline with which it has been designed to run in parallel.

In FIGS. 1 and 2 the letters DS indicate the downstream direction of gas flow within the primary gas pipeline 10, 16a indicates the portion of the liquid slug that has remained in the primary gas pipeline and 16b indicates the portion of the liquid slug that has entered the secondary gas pipeline. How to sealingly continuously connect the phase separation pipe to the gas pipeline will be obvious to those in the art; in the FIGS. 1 and 2 illustrations the sealing continuous connections are accomplished by cutting holes in the primary gas pipeline at points where the input end and the output end of the phase separation pipe will be connected to the primary gas pipeline and then welding the input 11 of the phase separation pipe to seal off the hole where it is connected to the primary gas pipeline, and then welding the output 15 to seal off the hole where it is connected to the primary gas pipeline.

In summary and further explanation: As stated previously the Inventor is not aware of any prior art inventions that are similar to the instant invention. Referring to FIGS. 1 and 2 it can be seen that a liquid slug which arrived at the input end connection of the secondary gas pipeline with the primary gas pipeline has divided into a smaller liquid slug 16b and a larger liquid slug 16a, with liquid slug 16b entering and traveling downstream in the secondary gas pipeline and with liquid slug 16b traveling in the primary gas pipeline 10. Once liquid slug 16a leaves the smaller diameter first section of the secondary gas pipeline and enters the larger diameter second section of the secondary gas pipeline it will begin to turn into a two phase flow comprised of a separate and distinguishable gas flow stream and a separate and distinguishable liquid flow stream. In the preferred embodiments illustrated in FIGS. 1 and 2 the lengths and diameters of the second sections have been selected such that the largest anticipatable liquid slug 16b will have been turned into a two phase flow of separate and distinguishable gas and liquid flow streams during its travel through the second section of the secondary gas pipeline. Accordingly, a liquid slug 16b will not be exiting the output end 15 of the secondary gas pipeline, but instead two separate and distinguishable flow streams, one gas and the other liquid will be exiting the output end 15 and re-entering the primary gas pipeline. Further, the lengths and diameters of the secondary gas pipeline have been selected such that the front of the largest anticipatable liquid slug 16a will be approximately at where output end 15 connects to the primary gas pipeline when the two separate and distinguishable flow streams, one gas and the other liquid are exiting the output end 15 and re-entering the primary gas pipeline. The result will be that in the primary gas pipeline, from and downstream of output end 15, the liquid slug 16a will begin to dissipate and turn into two separate and distinguishable flow streams, one gas and the other liquid. Therefore, the present invention can be used to, where desired along a gas pipeline, facilitate the transformation a liquid slug into two separate and distinguishable flow streams, one gas and the other liquid. The present invention will accomplish the aforesaid task in a relatively inexpensive and maintenance free manner, using readily available material and components, which are assembled in a unique and inventive way as disclosed in the invention.

I claim:

1. A method for facilitating the dissipation of liquid slugs within a primary gas pipeline that contains liquid slugs, and wherein the gas is flowing, downstream in the primary gas pipeline, and wherein between its starting point and its ending point, all locations alone the primary gas pipeline can be referred to as being either upstream or downstream of any other location along the primary gas pipeline, comprised of the steps of;

a.) providing a secondary gas pipeline that has an input end and an output end, wherein the input end is referred to as being upstream and the output end is referred to as being downstream, and wherein the input end and the output end of the secondary gas pipeline can each be communicatively connected to the primary gas pipeline, and wherein the secondary gas pipeline is of a configuration and of a length such that any of the anticipated liquid slugs that travel through it, from its input end to its output end, will tend to become a two phase flow of liquid and gas in which the liquid and the gas each has its own separate flow rate; and b.) communicatively connecting the input end of the secondary gas pipeline to the primary gas pipeline and communicatively connecting the output end of the secondary gas pipeline to the primary gas pipeline such that the secondary gas pipeline and the primary gas pipeline are running in parallel, and wherein the secondary gas pipeline's output end is connected to the primary gas pipeline at a location such that any liquid slug and gas traveling in a unified manner, and collectively referred to as "LSG" which arrives at the upstream point of connection of the primary gas pipeline with the secondary gas pipeline will divide into LSG1 that continues traveling down the primary gas pipeline and LSG2 that enters the secondary gas pipeline, wherein LSG1 is a portion of LSG and LSG2 is the remaining portion of LSG, such that LSG1+LSG2=LSG, and such that LSG2<LSG1, and such that when LSG2, which as explained in paragraph a.) above, during its travel through the secondary gas pipeline from its input end to its output end became a two phase flow of liquid and gas in which the liquid and the gas each has its own separate flow rate, leaves the secondary gas pipeline and re-enters the primary gas pipeline, the now two phase flow of liquid and gas will re-enter the primary gas pipeline at the time of the arrival, at the location at which LSG2 re-enters the primary gas pipeline, of the front portion of the largest LSG1 that is anticipated to be traveling through the primary gas pipeline.

2. A phase separation pipe for use in parallel with a gas pipeline which contains a pressurized gas flow stream that is flowing in the gas pipeline, and which gas pipeline also contains liquid that is flowing in the gas pipeline, which liquid may be in the form of a liquid slug; wherein the gas and liquid is flowing in the downstream direction in the gas pipeline, which phase separation pipe is comprised of:

a.) an input end; and a first section, which first section, at its upstream end, is in continuous communication with said input end; and a second section, which second section, at its upstream end, is in continuous communication with said first section at its downstream end; and an output end which is in continuous communication with said second section at its downstream end; wherein the first section is of a smaller diameter than the gas pipeline with which the phase separation pipe will be used; and wherein the second section is of a larger diameter than the first section; and wherein the input end may be sealingly attached to the gas pipeline; and wherein the output end may be sealingly attached to the gas pipeline downstream of the input end; and b.) wherein the configuration and the diameter of the first section of the phase separation pipe is such that when the input end of the phase separation pipe is sealingly attached to the gas pipeline and the output end of the phase separation pipe is sealingly attached to the gas pipeline downstream of the input end, then, for any liquid slug that is flowing downstream through the gas pipeline a portion of the liquid slug that is less than half of the liquid slug will enter the input end when the liquid slug arrives at the input end's point of connection to the gas pipeline; and c.) wherein the length and the configuration and the diameters of the phase separation pipe is such that any liquid slug and gas "LSG" traveling down the primary gas pipeline and arriving at the input end of the phase separation pipe will divide into a smaller portion LSG2 and a larger portion LSG1; wherein the smaller portion LSG2 will enter the input end of the phase separation pipe and will have become substantially turned into a two phase flow of separate gas and separate liquid prior to reaching the output end of the phase separation pipe; and wherein the front portion of LSG1 will not arrive at the junction of the output end of the phase separation pipe and the primary gas pipeline ahead of the gas which is exiting the output end of the phase separation pipe which gas is the gas that resulted from the transformation of LSG2 into a two phase flow.

3. A phase separation pipe for use in parallel with a gas pipeline which contains a pressurized gas flow stream that is flowing in the gas pipeline, and which gas pipeline also contains liquid that is flowing in the gas pipeline, which liquid may be in the form of a liquid slug; wherein the gas and liquid is flowing in the downstream direction in the gas pipeline, as described in claim 2; wherein the first section is not of a uniform diameter.

4. A phase separation pipe for use in parallel with a gas pipeline which contains a pressurized gas flow stream that is flowing in the gas pipeline, and which gas pipeline also contains liquid that is flowing in the gas pipeline, which liquid may be in the form of a liquid slug; wherein the gas and liquid is flowing in the downstream direction in the gas pipeline, as described in claim 2; wherein the second section is not of a uniform diameter.

5. A phase separation pipe for use in parallel with a gas pipeline which contains a pressurized gas flow stream that is flowing in the gas pipeline, and which gas pipeline also contains liquid that is flowing in the gas pipeline, which liquid may be in the form of a liquid slug; wherein the gas and liquid is flowing in the downstream direction in the gas pipeline, as described in claim 2; wherein the first section is not of a uniform diameter, and wherein the second section is not of a uniform diameter.

* * * * *